United States Patent
Yi et al.

(10) Patent No.: US 8,349,058 B2
(45) Date of Patent: Jan. 8, 2013

(54) REGENERATION REACTOR OF $CO_2$ CAPTURE SYSTEM

(75) Inventors: Chang-Keun Yi, Daejeon (KR); Gyoung-Tae Jin, Daejeon (KR); Do-Won Shun, Daejeon (KR); Sung-Ho Jo, Daejeon (KR); Jae-Hyeon Park, Daejeon (KR); Dal-Hee Bae, Daejeon (KR); Ho-Jung Ryu, Daejeon (KR); Young-Cheol Park, Daejeon (KR); Seung-Yong Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 310 days.

(21) Appl. No.: 12/741,746

(22) PCT Filed: Feb. 11, 2008

(86) PCT No.: PCT/KR2008/000769
§ 371 (c)(1),
(2), (4) Date: May 6, 2010

(87) PCT Pub. No.: WO2009/061029
PCT Pub. Date: May 14, 2009

(65) Prior Publication Data
US 2011/0088557 A1    Apr. 21, 2011

(30) Foreign Application Priority Data

Nov. 9, 2007   (KR) .................. 10-2007-0114106

(51) Int. Cl.
*B01D 53/02*   (2006.01)
*B01D 53/62*   (2006.01)

(52) U.S. Cl. ............. 96/144; 96/150; 423/230
(58) Field of Classification Search .......... 95/107, 95/108, 139, 148; 96/123, 143, 144, 150; 55/459.1; 423/230
See application file for complete search history.

(56) References Cited

U.S. PATENT DOCUMENTS

| | | | | |
|---|---|---|---|---|
| 2,379,711 A | * | 7/1945 | Hemminger | 208/157 |
| 2,397,352 A | * | 3/1946 | Hemminger | 585/659 |
| 2,583,611 A | * | 1/1952 | Sullivan, Jr. | 518/722 |

(Continued)

FOREIGN PATENT DOCUMENTS

JP          05-123524          5/1993

(Continued)

OTHER PUBLICATIONS

International Search Report—PCT/KR2008/000769 dated Aug. 8, 2008.

*Primary Examiner* — Frank Lawrence, Jr.
(74) *Attorney, Agent, or Firm* — Kile Park Goekjian Reed & McManus PLLC

(57) ABSTRACT

A regeneration reactor of a $CO_2$ capture system is disclosed. According to an embodiment of the present invention, in the $CO_2$ capture system comprising a capture reactor selectively adsorbing $CO_2$ by bringing a $CO_2$-containing gas supplied from the outside into contact with a solid adsorbent, and a regeneration reactor separating the adsorbed $CO_2$ from the solid adsorbent adsorbed with the $CO_2$, the regeneration reactor includes a chamber having an inverted truncated cone shape being widened toward an upper part and narrowed toward a lower part, such that a pressure in the regeneration reactor is constantly maintained through the whole part and accordingly, a flow velocity in the chamber can be constantly maintained.

4 Claims, 5 Drawing Sheets

U.S. PATENT DOCUMENTS

| | | | |
|---|---|---|---|
| 2,636,574 A * | 4/1953 | Widdowson et al. | 95/108 |
| 2,684,931 A * | 7/1954 | Berg | 208/47 |
| 4,038,038 A * | 7/1977 | Bunn et al. | 422/144 |
| 5,304,234 A * | 4/1994 | Takatsuka et al. | 95/106 |
| 5,397,179 A | 3/1995 | Berlin et al. | |
| 5,496,395 A * | 3/1996 | Yamazaki | 96/123 |
| 5,770,785 A | 6/1998 | Tamura et al. | |
| 6,436,161 B1 * | 8/2002 | Abatzoglou et al. | 55/419 |
| 2007/0283812 A1 * | 12/2007 | Liu et al. | 96/150 |

FOREIGN PATENT DOCUMENTS

| | | |
|---|---|---|
| KR | 10-2005-0003767 | 1/2005 |

* cited by examiner

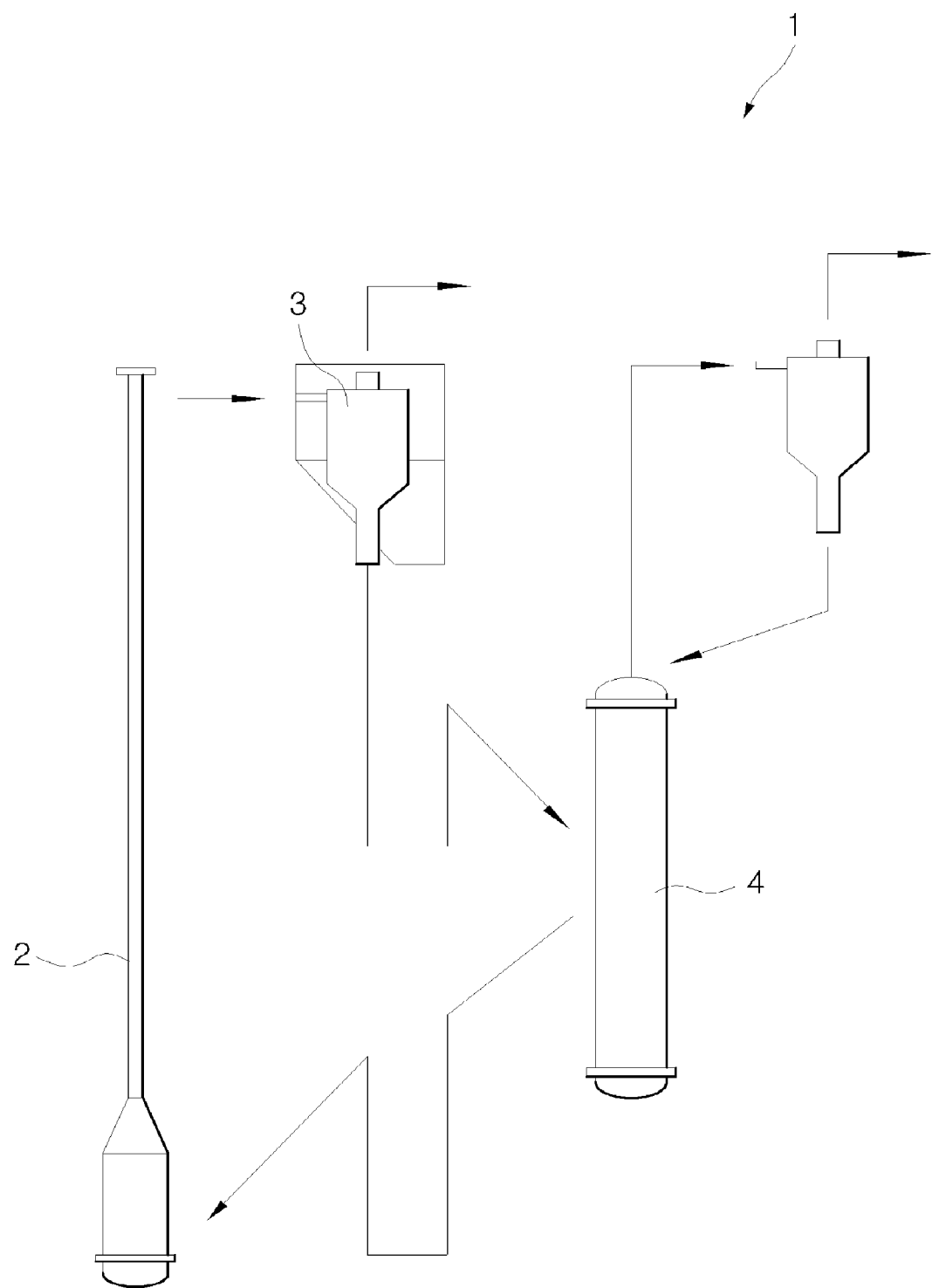
Fig.5  *Prior Art*

REGENERATION REACTOR OF $CO_2$ CAPTURE SYSTEM

TECHNICAL FIELD

The present invention relates to a regeneration reactor of a $CO_2$ capture system including a capture reactor adsorbing $CO_2$ through contact between a $CO_2$-containing gas supplied from the outside and a dry solid adsorbent and the regeneration reactor separating the $CO_2$ from the dry solid adsorbent adsorbed with the $CO_2$, the regeneration reactor capable of maintaining a constant flow velocity of the gas by maintaining a constant pressure through the whole regeneration reactor by structuring a chamber of the regeneration reactor in the form of an inverted truncated cone having a wide upper part and a narrow lower part.

BACKGROUND ART

In general, a great quantity of $CO_2$ is generated as a result of a pyrolysis process for collecting combustible gas and oil substances from a solid fuel and other industrial combustion processes. The $CO_2$ is selectively removed in order to improve concentration of the collected substances.

Conventionally, a wet method has been used to capture $CO_2$. More specifically, according to the wet method, an amine-based solution is passed through $CO_2$-containing gas to adsorb $CO_2$ and the solution is regenerated in a regeneration tower for reuse. However, such a wet method is disadvantageous since it additionally produces waste water.

In order to overcome the problem of the wet method, a dry method has been introduced to capture $CO_2$. The dry method captures $CO_2$ using two types of reactors. More specifically, $CO_2$ supplied to a capture reactor is removed by being adsorbed on a solid adsorbent (dry adsorbent) and then the solid adsorbent is guided into the regeneration reactor to be supplied back to the capture reactor after removal of the adsorbed $CO_2$.

An example of a $CO_2$ capture system 1 using the dry method is disclosed in Korean Patent Registration No. 10-0527420 (dated Nov. 12, 2005). With reference to FIG. 5, the $CO_2$ capture system 1 comprises a capture reactor 2 which captures $CO_2$ using contact with a solid adsorbent, a cyclone 3 which receives the solid adsorbent adsorbed with $CO_2$ of the capture reactor 2 and other gases and centrifugally separates the solid adsorbent and the gas substances from each other, and a regeneration reactor 4 which receives the solid adsorbent adsorbed with the $CO_2$ separated by the cyclone 3 and separates $CO_2$ from the solid adsorbent.

According to the conventional system, a fluidizing gas is supplied from a lower part to an upper part of the regeneration reactor 4 having a cylinder form so as to separate the $CO_2$ adsorbed on the solid adsorbent. However, since the fluidizing gas is added with the separated $CO_2$ while moving to the upper part, quantity of the moving gas is increased toward the upper part. Therefore, the pressure at the upper part of the regeneration reactor 4 becomes higher than at the lower part. Accordingly, the flow velocity of the gas gradually decreases and the separation of $CO_2$ is not performed favorably.

DISCLOSURE OF INVENTION

Technical Problem

Therefore, the present invention has been made in view of the above problems, and it is an object of the present invention to provide a regeneration reactor of a $CO_2$ capture system, capable of maintaining a constant flow velocity of a moving gas by maintaining a constant pressure through the whole regeneration reactor by structuring a chamber of the regeneration reactor in the form of an inverted truncated cone having a wide upper part and a narrow lower part.

Technical Solution

In accordance with an aspect of the present invention, the above and other objects can be accomplished by the provision of a regeneration reactor of a $CO_2$ capture system which comprises a capture reactor selectively adsorbing $CO_2$ by bringing a $CO_2$-containing gas supplied from the outside into contact with a solid adsorbent, a cyclone centrifugally separating the solid adsorbent adsorbed with $CO_2$ in the capture reactor from the gas, and a regeneration reactor separating the adsorbed $CO_2$ by supplying a regenerative gas to the solid adsorbent supplied from the cyclone, the regeneration reactor including a chamber having a slope to be widened toward an upper part and narrowed toward a lower part and therefore capable of preventing increase of a pressure at the upper part due to the $CO_2$ separated at the lower part, such that a flow velocity in the chamber can be constantly maintained.

The chamber may be formed as an inverted truncated cone as a whole. Alternatively, the chamber may comprise a pipe part disposed at the lower part and charged with a solid adsorbent, and a flared part connected at an upper end of the pipe part and widened upward in the form of an inverted truncated cone to allow passage of gas.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a sectional view schematically showing a general conventional regeneration reactor.

BEST MODE FOR CARRYING OUT THE INVENTION

Figure 1:
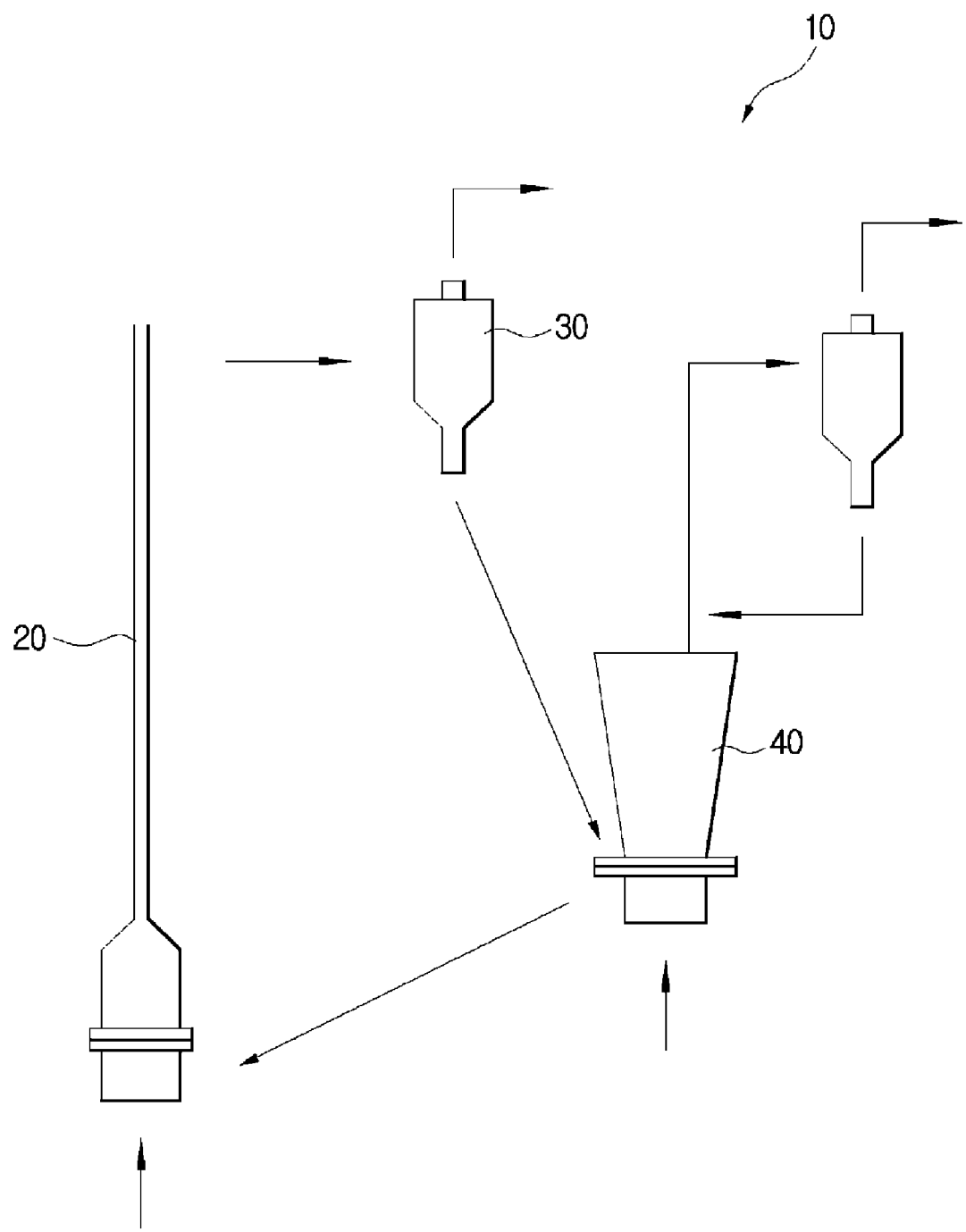
FIG. 1 is a view schematically showing the whole $CO_2$ capture system applying a regeneration reactor according to the present invention.

As shown in FIG. 1, a $CO_2$ capture system 10 employing a regeneration reactor 40 according to an embodiment of the present invention comprises a capture reactor 20 which is supplied with a gas containing $CO_2$ and brings the $CO_2$-containing gas into contact with a solid adsorbent to thereby selectively adsorb $CO_2$ contained in the gas. A gas distribution plate is formed in the middle of the capture reactor 20 such that a fluidizing gas flown in from a lower part of the capture reactor 20 is uniformly discharged through an upper part. As the solid adsorbent is thus fluidized, a contacting area between the solid adsorbent and the gas flown into the capture reactor 20 can be increased.

The solid adsorbent adsorbed with the $CO_2$ and the $CO_2$-removed gas are supplied to a cyclone 30 such that solid substances and gas substances are centrifugally separated from each other. The separated gas substances are recycled through a dedicated process whereas the solid substances are supplied to the regeneration reactor 40.

The regeneration reactor 40 supplied with the solid adsorbent adsorbed with the $CO_2$ separates the $CO_2$ from the solid adsorbent by a regenerative gas and a hot steam supplied from the lower part thereof. Here, in a chamber 41 of the regeneration reactor 40, as the separated $CO_2$ quantity increases toward the upper part owing to the regenerative gas supplied from the lower part, pressure of the upper part is increased to be higher than pressure of the lower part. Such a pressure increases causes a difference of pressure distributed in the chamber 41. Therefore, the moving solid adsorbent is exposed to the regenerative gases or the steams having different flow velocities, thereby inducing partially different separation rates. In other words, according to the embodiment of the present invention, since the regenerative gas or the steam moving upward is resisted by the pressure difference in the chamber 41, it becomes difficult to maintain a constant flow velocity in the chamber 41. To this end, the chamber 41 is designed to be widened toward an upper part thereof.

Figure 2:
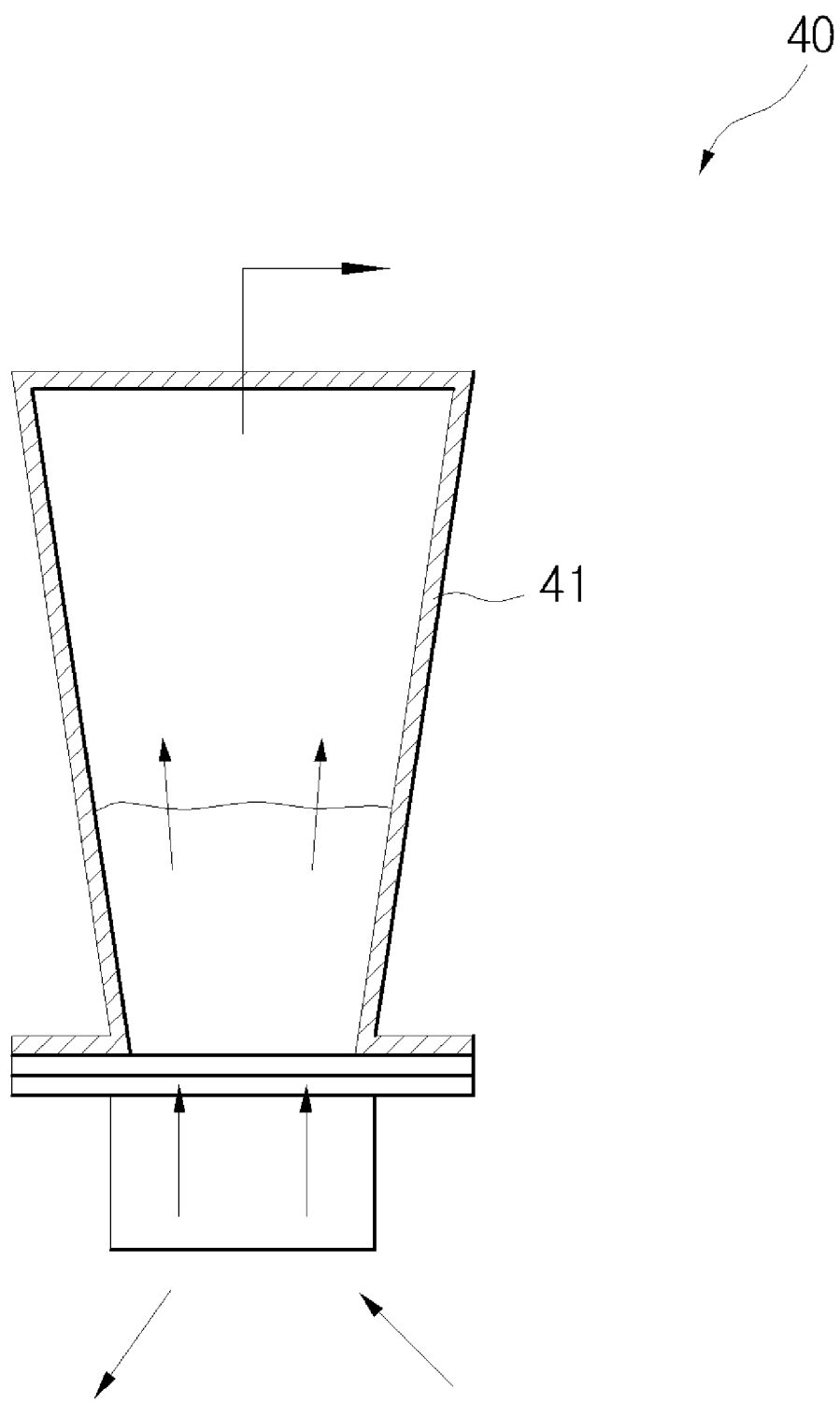
FIG. 2 is a sectional view schematically showing a regeneration reactor according to an embodiment of the present invention.

For example, as shown in FIG. 2, the chamber 41 of the regeneration reactor 40 may be formed in an inverted truncated conical shape having a slope to be widened toward the upper part while narrowed toward the lower part, such that the regenerative gas (steam) supplied from the lower part can be distributed laterally as moving upward, thereby properly decreasing the pressure at the upper part. After the solid adsorbent adsorbed with $CO_2$ is supplied to the chamber 41 and the regenerative gas is supplied from the lower part to the upper part, the regenerative gas separates $CO_2$ from the solid adsorbent, thereby regenerating the solid adsorbent. In addition, as the separated $CO_2$ fills the chamber 41, the pressure in the chamber 41 becomes uniform through the whole part. As a result, the flow velocity of the regenerative gas (steam) in the regeneration reactor 40 can be constantly maintained.

Here, the chamber 41 is preferably formed under the condition of [Equation 1] as follows:

$$\frac{Q_{out}}{Q_{in}} = 3 \sim 4 \qquad \text{[Equation 1]}$$

($Q_{in}$: Injected flow quantity in regeneration reactor, $Q_{out}$: Flow quantity at upper part of regeneration reactor)

If the chamber 41 is designed to result in a smaller value than in the above equation, the flow velocity at the upper part of the regeneration reactor 40 increases so that the solid adsorbent may leak out through the upper part. On the other hand, if the chamber 41 is designed to result in a greater value, the separation of $CO_2$ from the solid adsorbent is performed only at a certain part, that is, the performance is deteriorated. Accordingly, it is preferred that the chamber 41 is designed to satisfy the above equation.

For example, diameters of the upper part and the lower part of the chamber 41 are designed depending on the flow velocity as follows. When the flow velocity at the lower part of the regeneration reactor 40 is 0.02 m/s, a lower diameter is preferably designed to be 0.1 m. When the flow velocity at the upper part of the regeneration reactor 40 is 0.02 m/s, an upper diameter is preferably designed to be 0.184 m.

Figure 3:
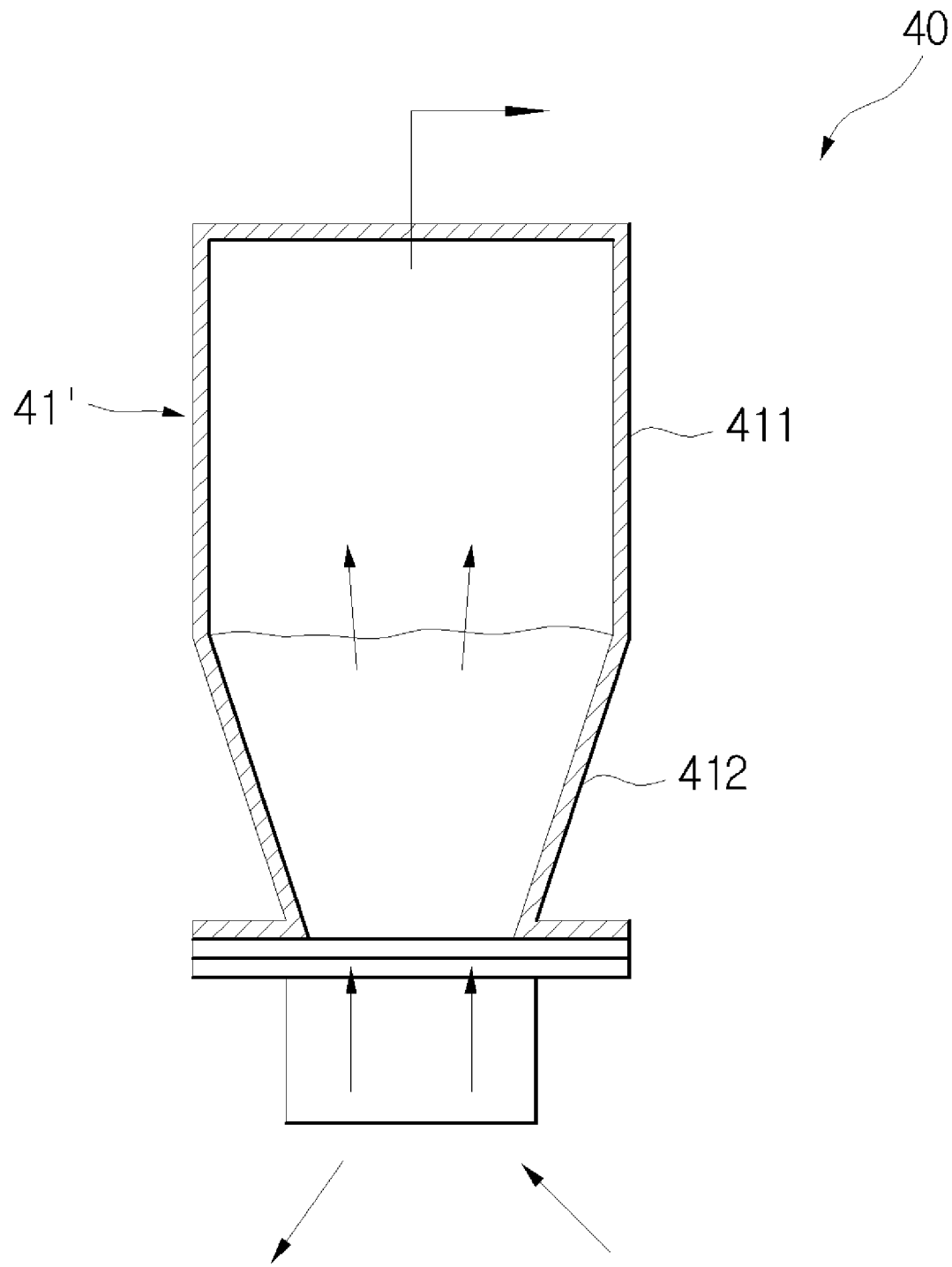
FIG. 3 is a sectional view schematically showing a regeneration reactor according to another embodiment of the present invention.

Referring to FIG. 3, a chamber 41' of the regeneration reactor 40 according to another embodiment comprises a flared part 412 disposed at a lower part thereof where the solid adsorbent is accumulated and formed as an inverted truncated cone, and a pipe part 411 disposed above the flared part 412 and formed as a cylindrical pipe.

According to this configuration, the separated $CO_2$ is increased in the flared part 412 but no further $CO_2$ is added to the gas while the gas is flowing in the pipe part 411 disposed above the flared part 412. As a result, the pressure can be maintained almost uniformly through the whole part of the chamber 41'.

Figure 4:
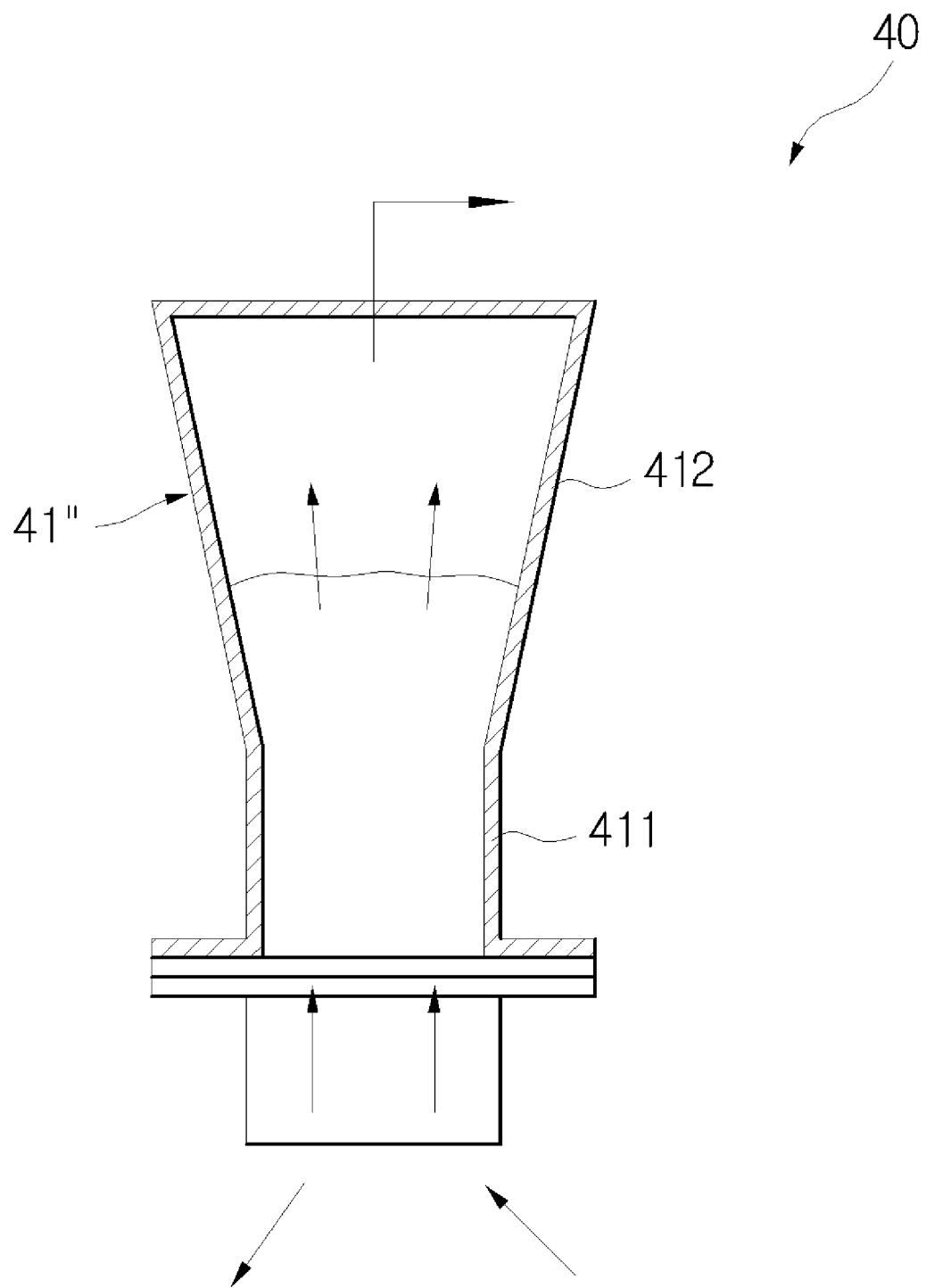
FIG. 4 is a sectional view schematically showing a regeneration reactor according to yet another embodiment of the present invention.

As shown in FIG. 4, a chamber 41" of the regeneration reactor 40 according to yet another embodiment of the present invention comprises pipe part 411 having a cylindrical form and disposed at the lower part thereof where the solid adsorbent is accumulated, and a flared part 412 having an inverted truncated conical form for achieving the constant flow velocity and disposed at the upper part thereof.

According to the configuration as shown in FIG. 4, the steam or the regenerative gas initially flowing into the chamber 41" is passed through the same cross-sectional area of the pipe part 411 where a quantity of the solid adsorbent is accumulated. Afterward, when passing through the flared part 412 disposed at the upper part, where a quantity of the separated $CO_2$ is expected to be generated and thereby increase the pressure, the steam or the regenerative gas can be flown to the upper part without varying in the flow velocity because the cross-sectional area through which the gas passes is increased toward the upper part.

As can be appreciated from the above explanation, the chamber 41 of the regeneration reactor 40 is designed to maintain a constant flow velocity of the gas in the chamber 41 by minimizing an influence of the separated $CO_2$ quantity. More specifically, in order to minimize variation of the flow velocity according to the pressure in the chamber 41, the cross-sectional area through which the gas passes is increased by as much as the separated $CO_2$ quantity increasing as the initial steam or the regenerative gas flows, such that a constant flow velocity in the chamber 41 is maintained. For this purpose, the cross-sectional area is varied along a vertical direction of the chamber 41 as described above, and this principle can be applied to any other gas separating processes.

INDUSTRIAL APPLICABILITY

In a regeneration reactor for a $CO_2$ capture system according to the embodiments of the present invention, a chamber of the regeneration reactor, in which a solid adsorbent adsorbed with $CO_2$ is supplied and processed, is designed to be widened toward an upper part thereof. Accordingly, although the pressure increases toward the upper part due to gas flowing from a lower part to the upper part and separated $CO_2$ added to the gas, the chamber widening toward the upper part is capable of restraining the increase of pressure by maintaining a constant quantity of the flowing gas per unit area. As a consequence, a flow velocity of the gas in the chamber can be constantly maintained and therefore more uniform and stable separation of $CO_2$ can be achieved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A regeneration reactor of a $CO_2$ capture system which comprises a capture reactor selectively adsorbing $CO_2$ by bringing a $CO_2$-containing gas supplied from the outside into contact with a solid adsorbent, a cyclone centrifugally separating the solid adsorbent adsorbed with $CO_2$ in the capture reactor from the gas, and a regeneration reactor separating the adsorbed $CO_2$ by supplying a regenerative gas to the solid adsorbent supplied from the cyclone, the regeneration reactor including a chamber having a slope which is widened toward an upper part and narrowed toward a lower part and therefore capable of preventing a pressure at the upper part from being increased as the separation quantity of the $CO_2$ separated at the solid adsorbent increases at it goes upward to the upper part by the regenerative gas supplied at the lower part, such that a flow velocity in the chamber can be constantly maintained, wherein the chamber is designed to satisfy a following equation:

$Q_{out}/Q_{in}=3~4$ wherein Qout is the flow quantity at upper part including $CO_2$ separated at the solid adsorbent and the regenerative gas discharged to upper part of the chamber and Qin is the injected flow quantity of the injected regenerative gas.

2. The regeneration reactor of the $CO_2$ capture system according to claim 1, wherein the chamber is formed as an inverted truncated cone.

3. The regeneration reactor of the $CO_2$ capture system according to claim 1, wherein the chamber comprises a flared part charged with a solid adsorbent and formed as an inverted truncated cone to separate $CO_2$, and a pipe part connected to an upper end of the flared part in the form of a cylindrical pipe.

4. The regeneration reactor of the $CO_2$ capture system according to claim 1, wherein the chamber comprises a pipe part disposed at the lower part and charged with a solid adsorbent, and a flared part connected at an upper end of the pipe part and widened upward in the form of an inverted truncated cone to allow passage of gas.

* * * * *